United States Patent [19]

Sasuta et al.

[11] Patent Number: 5,287,552
[45] Date of Patent: Feb. 15, 1994

[54] METHOD FOR MORE EFFICIENT SERVICE REQUEST PROCESSING

[75] Inventors: Michael D. Sasuta, Mundelein; Jian-Cheng Huang, Schaumburg, both of Ill.

[73] Assignee: Motorola, Inc., Schaumburg, Ill.

[21] Appl. No.: 828,327

[22] Filed: Jan. 30, 1992

[51] Int. Cl.⁵ .............................................. H04Q 7/02
[52] U.S. Cl. ..................................... 455/54.2; 455/34.1
[58] Field of Search ...................... 455/17, 33.1, 54.1, 455/54.2, 58.2, 34.2, 34.1, 58.1, 53.1; 379/59, 63, 60

[56] References Cited

U.S. PATENT DOCUMENTS

| | | | |
|---|---|---|---|
| 4,012,597 | 3/1977 | Lynk, Jr. et al. | 455/54.2 |
| 4,696,029 | 9/1987 | Cohen | 455/2 |
| 4,716,407 | 12/1987 | Borras et al. | 455/54.2 |
| 5,054,109 | 10/1991 | Blackburn | 455/17 |
| 5,097,499 | 3/1992 | Cosentino | 379/59 |

Primary Examiner—Reinhard J. Eisenzopf
Assistant Examiner—Nguyen Vo
Attorney, Agent, or Firm—Timothy W. Markison; Steven G. Parmelee

[57] ABSTRACT

A communication resource allocator of a trunking communication system may more efficiently handle service requests during extremely busy times in the following manner. While receiving service requests from communication units, the communication resource allocator determines whether it can process the service request within a predetermined period of time. If the communication resource allocator cannot process the service request within a predetermined period it generates a global system busy which indicates that the communication resource allocator cannot individually process or acknowledge additional service requests. Having generated the global system busy signal, the communication resource allocator transmits it to the plurality of communication units. The communication units process the global system busy signal such that they will not transmit nonpriority service requests during the duration of the global system busy signal. While the global system busy signal is active, the communication resource allocator processes received service requests and any service request having a priority service level until the processing time of the non priority service request is at least a portion of the predetermined period of time.

9 Claims, 2 Drawing Sheets

METHOD FOR MORE EFFICIENT SERVICE REQUEST PROCESSING

FIELD OF THE INVENTION

This invention relates generally to trunking communication systems and in particular to a method that allows a communication resource allocator to process substantially all the service requests received.

BACKGROUND OF THE INVENTION

Trunking communication systems are known to comprise a plurality of communication units, a limited number of communication resources that are transceived via a predetermined number of repeaters, or base stations, and a communication resource allocator that allocates a limited number of communication resources among the plurality of communication units. The communication resources may comprise a TDM bus, a carrier frequency, a pair of carrier frequencies, or any RF transmission means. Of the communication resources, one is selected as the control channel to transceive operational data between the communication resource allocator and the communication units. The communication units, which may be portable radios and/or mobile radios, are arranged into talk groups by commonality of use. For example, a talk group may comprise communications that are operated by a police department while another talk group comprises communication units operated by a fire department.

In a typically trunking communication system, the communication units transmit service request to the communication resource allocator. The service request may comprise requesting allocation of a communication resource, a change in the communication units parameters, etc. The communication allocator receives these service requests and responds to them typically in a first in first out fashion. As each service request is received, it is either processed or placed in a service request waiting queue within the communication resource allocator. When the trunking communication system is very busy, the communication resource allocator may be processing service requests at a maximum rate and yet the service request queue becomes full. Under these circumstances, service requests that are transmitted after the service request queue is full are ignored. Therefore, a need exists for a method that will allow the communication resource allocator to substantially respond to all service requests.

SUMMARY OF THE INVENTION

This need and others are substantially met by the method for more efficient service request processing disclosed herein. In a trunking communication system that comprises a plurality of communication units a limited number of communication resources that are transceived via a predetermined number of repeaters, and a communication resource allocator that allocates the limited number of communication resources among the plurality of communication units based upon service requests by the communication units and wherein the communication resource allocator receives more service requests than it can process such that at least some of the service requests are not being processed, the following describes a method that allows the communication resource allocator to process substantially all the service requests received. As a communication resource allocator receives service request, it determines whether the service requests received can be processed within a predetermined period of time. If the service request cannot be processed within the predetermined period time, the communication resource allocator generates a global system busy signal that indicates that it cannot individually process or acknowledge the service request received and will temporarily not process non-priority service requests. The communication resource allocator then transmits the global system busy to the communication units. The communication units process the system busy signal such that they will not transmit non-priority service requests for the duration of the global system busy signal. While the global system busy signal is active, the communication resource allocator processes the service requests that have been received and processes any service request having a priority level. The communication resource allocator will transmit a global system non-busy signal when the processing time is below at least a portion of the predetermined period of time.

DESCRIPTION OF A PREFERRED EMBODIMENT

Figure 1:
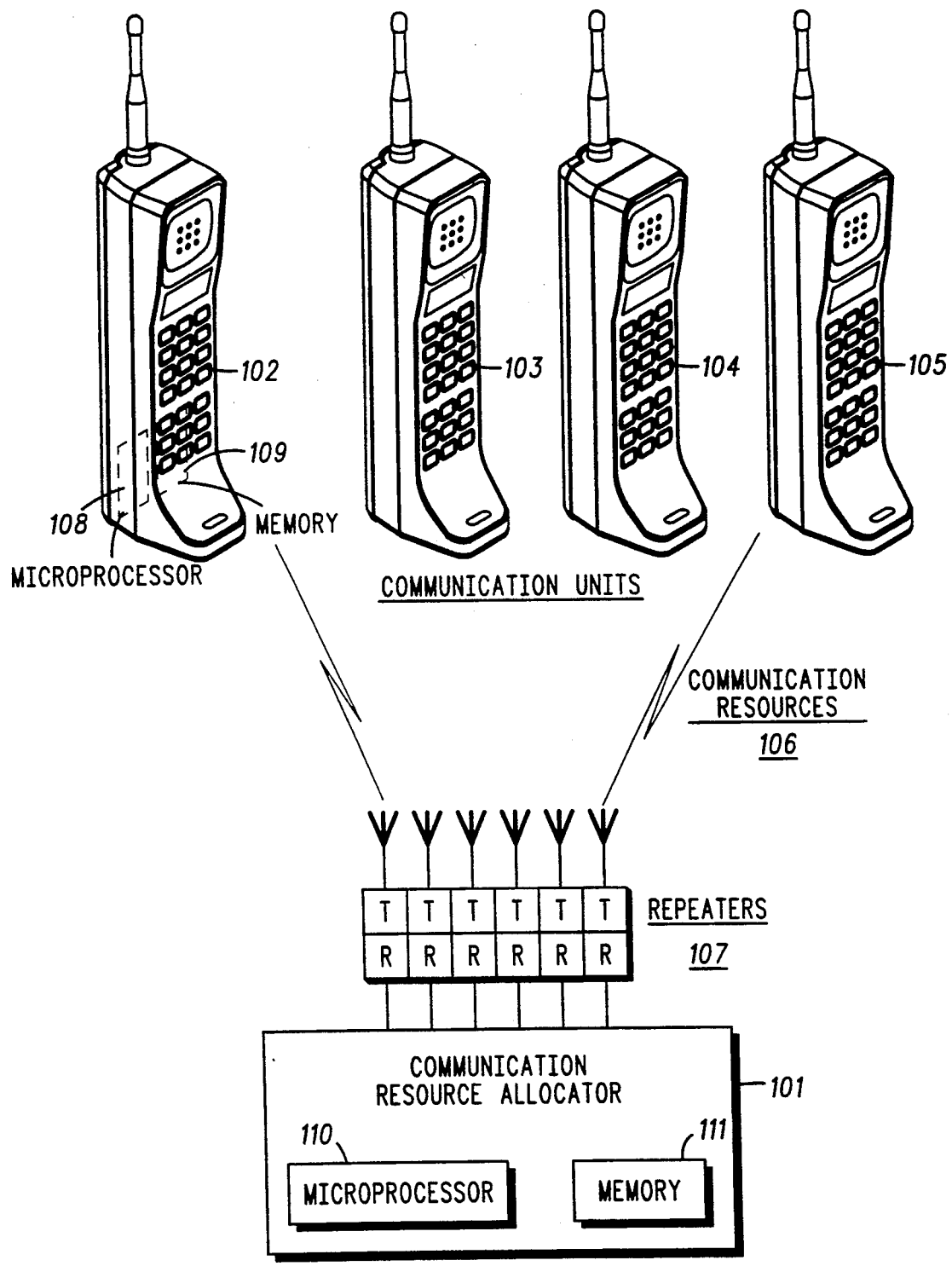
FIG. 1 illustrates a trunked communication system that may incorporate the present invention.

FIG. 1 illustrates a trunking communication system comprising a communication resource allocator 101, a plurality of communication units (four shown) 102-105, a limited number of communication resources 106, and a limited number of repeaters 107. Each of the communication units 102-105, comprise at least one microprocessor 108 and a digital storage memory device 109 which may be RAM, ROM or any other type of means for storing digital information. The communication resource allocator 101 comprises at least one microprocessor 110 and digital memory 111, wherein the digital memory may be RAM, ROM, or any other type of means for storing digital information. Each of the communication resources 106 are transceived between the communication units 102-105 and the communication resource allocator 101 via the repeaters 107, wherein the repeaters may comprise base stations. One of the communication resources 106 is selected as the control channel which transceives trunking communication system control data between the communication resource allocator and the communication units 102-105.

To initiate a service request, a communication unit transmits an inbound signalling word (ISW) to the communication resource allocator, wherein the ISW contains a request to perform a system service. A system service may be a request for an allocation of communication resource, a transmission of data to the communication resource allocator, telephone interconnect, or any other service the communication system can support. Once the communication resource allocator receives the service request, it processes the request on a first come first served basis with exceptions for priority requests.

Figure 2:
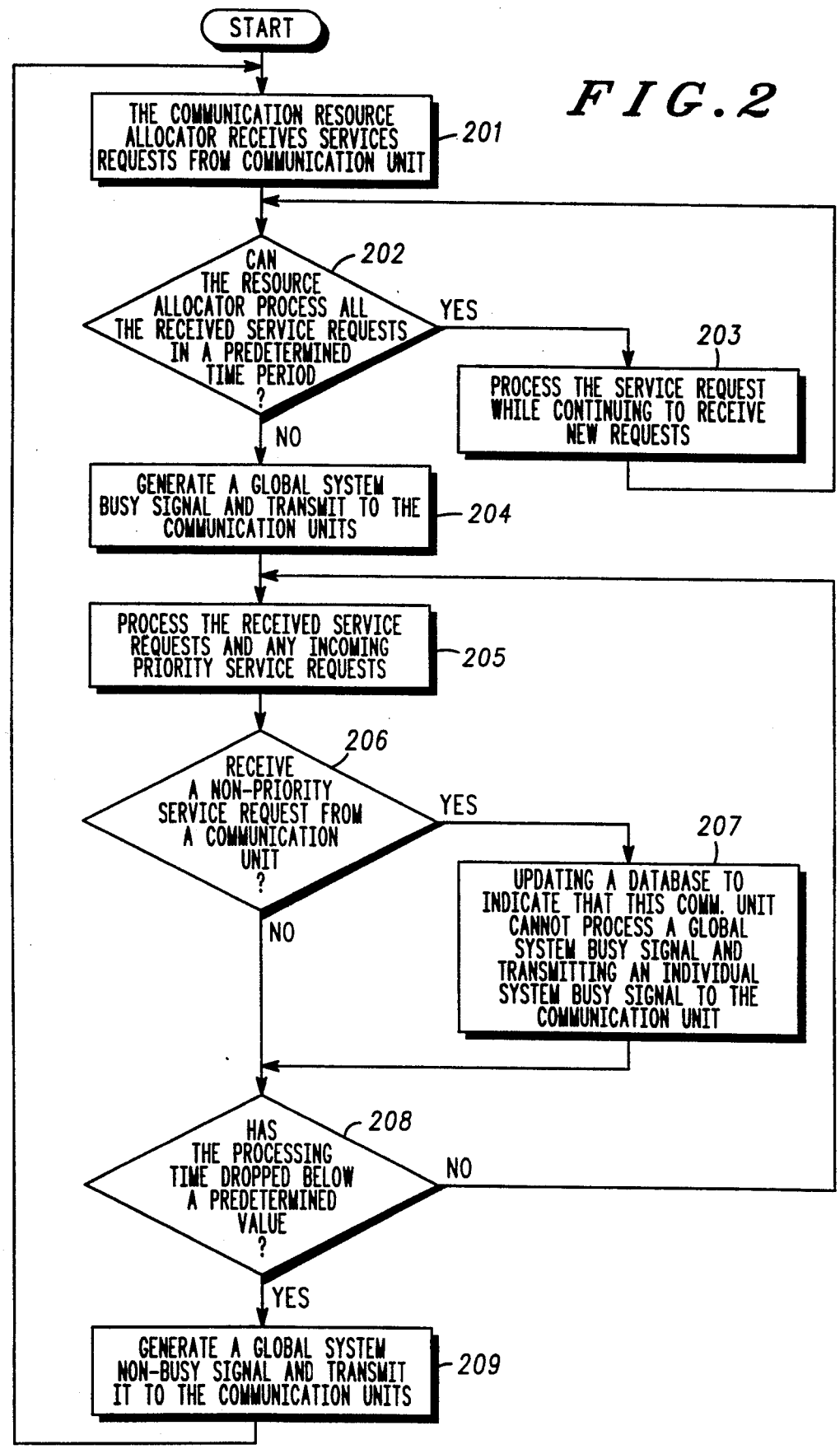
FIG. 2 illustrates a logic diagram of an implementation of the present invention.

As discussed in the background section, when the communication system becomes very busy, i.e. a substantial number of communication units are requesting service, the communication resource allocator can become overloaded. Communication resource allocator overload results when the communication resource allocator's service request queue is full and ignores requests that are subsequently transmitted. Overloading can be substantially avoided by the process illustrated in FIG. 2 which allows the communication resource allocator to limit the types of services it will process when the communication system becomes very busy.

At step 201m the communication resource allocator receives a service request from at least one communication unit. The communication resource allocator determines whether it can process all the received service requests in a predetermined period of time 202. The communication resource allocator stores, in memory, the execution time it takes to perform each type of service request, which is known in the art. Thus, the communication resource allocator can calculate the processing time for the received service requests. The predetermined time may vary depending on system needs. For example, the predetermined period of time may be as small as a few hundred milliseconds or as great as 10 seconds.

If the communication resource allocator can process all the received service requests in the predetermined period of time 202, the communication resource allocator continues to process and receive new service requests 203. If, however, the communication resource allocator cannot process all the received service requests in the predetermined period of time 202, the communication resource allocator generates a global system busy signal and transmits it to the communication units 204. The communication resource allocator then processes the received service requests it has stored and any incoming service requests that have a priority level 205. In the alternative to processing the service requests in the service request queue, the communication resource allocator may replace service request acknowledgements that were transmitted before the global system busy signal was generated with a global system busy signal. A priority level service request may be dependent on the situation, such as an emergency, or dependent upon the user, such as a police, chief.

While processing the service request that it has stored and any incoming priority service requests, the communication resource allocator also monitors to see whether it receives any nonpriority service request 206. If the communication resource allocator receives a nonpriority service request from a communication unit, it transmits an individual system busy signal to that unit and updates an internal data base to indicate that this particular communication unit cannot process global system busy signals 207. The data base within the communication resource allocator can be any form of memory device that allows digital information to be stored such as a RAM or magnetic tape.

In addition to monitoring for nonpriority service requests, the communication resource allocator monitors the execution time and estimated execution time of the service requests stored to determine whether the processing time has dropped below a predetermined value 208. If the processing time has not dropped below the predetermined value 208, the process repeats at step 205. If the processing time has dropped below the predetermined value 208, the communication resource allocator generates a global system nonbusy signal and transmits it to the communication units 209. This would then complete the algorithm for this particular overload situation of the communication resource allocator. The predetermined value of step 208 may comprises a portion of the predetermined period of time of step 202. For example, if the predetermined period of time for step 202 is one second, the predetermined value of step 208 may be 500 milliseconds.

By incorporating the above process in to a trunking communication system, all service requests will be responded to and not ignored as in prior art systems. In addition to responding to all service requests, the present invention may be easily retrofitted in to existing trunking communication systems by programming the respective portions of the present process in to existing microprocessors of the communication resource allocator and the communication units. However, some communication units and communication resource allocators may require additional microprocessing to perform the present invention.

We claim:

1. In a trunking communication system that comprises a plurality of communication units, a limited number of communication resources that are transceived via a predetermined number of repeaters, and a communication resource allocator that allocates the limited number of communication resources among the plurality of communication units based upon service requests by the communication units, a method that allows the communication resource allocator to process an overloading of service requests, the method comprises the steps of:

a) determining whether received service requests, which are either processed upon receipt or stored in a service request waiting queue will be processed within a predetermined period of time;

b) when the communication resource allocator will not process all of the received service requests in the predetermined period of time, generating a global system busy signal that indicates that the communication resource allocator cannot individually process or acknowledge the received service requests within the predetermined period of time and will temporarily process only priority service requests;

c) transmitting the global system busy signal to the plurality of communication units, wherein the plurality of communication units that receive and process the global system busy signal will only transmit priority service requests for the duration of the global system busy signal; and d) processing the received service requests and received priority service requests while not processing non priority service requests until processing time of the received service requests and the received priority service requests is at least a portion of the predetermined period of time.

2. The method of claim 1 further comprises e) generating a global system non-busy signal that indicates that the communication resource allocator processing time of non-priority service request is at least a portion of the predetermined period of time;

f) transmitting the global system non-busy signal to the plurality of communication units; and g) receiving and processing all service requests until the processing time of the communication resource allocator exceeds the predetermined period of time.

3. The method of claim 1 further comprises maintaining a database that indicates the communication units of the plurality of communication units that are equipped to process the global system busy signal and the communication units that are not equipped to process the global system busy signal.

4. The method of claim 3 further comprises:
e) receiving a non-priority service request from at least one communication unit that cannot process the global system busy signal after transmitting the global system busy signal; and
f) transmitting an individual system busy signal to the at least one communication unit.

5. In a trunking communication system that comprises a plurality of communication units, a limited number of communication resources that are transceived via a predetermined number of repeaters, and a communication resource allocator that allocates the limited number of communication resources among the plurality of communication units based upon service requests by the communication units, a method for a communication unit of the plurality of communication units to respond to a service request system overload condition, the method comprises the steps of:
a) receiving a global system busy signal from the communication resource allocator, wherein the global system busy signal indicates that the communication resource allocator will only process priority service requests and service requests that have been stored in a service request waiting queue;
b) processing the global system busy signal to determine the priority service requests the communication resource allocator will process; and
c) when a service request is initiated, transmitting a priority service request of the priority service requests to the communication resource allocator and not transmitting non-priority service requests until a global system non-busy signal is received.

6. In the method of claim 5, the processing of step (b) further comprises prioritizing service request within the communication unit.

7. In the method of claim 6, step (b) further comprises determining priority of the service request based on an individual system priority level assigned to the communication unit and type of service request.

8. The method of claim 5 further comprises, for a service request that was transmitted prior to receiving the global system busy signal that has received an individual acknowledgement of the service request, replacing the individual acknowledgement with the global system busy signal.

9. The method of claim 5 further comprises receiving the global system non-busy signal.

* * * * *